United States Patent [19]

Danos et al.

[11] 4,183,283

[45] Jan. 15, 1980

[54] METHODS OF CUTTING PATTED HOLLOW FILAMENTS

[75] Inventors: James C. Danos, Chapel Hill; Robert J. Heider, Durham, both of N.C.

[73] Assignee: Monsanto Company, St. Louis, Mo.

[21] Appl. No.: 855,845

[22] Filed: Nov. 30, 1977

[51] Int. Cl.² .......................... B23C 3/00; B23B 1/00
[52] U.S. Cl. ..................... 90/11 C; 82/1 C; 225/1; 225/103
[58] Field of Search ............... 90/11 C; 225/1, 103; 82/1 C, 47, 48

[56] References Cited

U.S. PATENT DOCUMENTS

| | | | |
|---|---|---|---|
| 2,328,302 | 8/1943 | Simison | 90/11 C |
| 3,503,288 | 3/1970 | Swartling | 82/48 |
| 3,696,708 | 10/1972 | Lopas | 90/11 C |
| 4,061,574 | 12/1977 | Clark | 210/321 R |

*Primary Examiner*—Leonidas Vlachos
*Attorney, Agent, or Firm*—Norman L. Balmer; Howard C. Stanley; James W. Williams, Jr.

[57] ABSTRACT

Hollow filaments, which are suitable for use in separating one or more components from a fluid mixture by selective permeation, are embedded, or potted, in a solid potting mass and the potting mass is severed to expose fluid communication openings of the hollow filaments. In accordance with the invention a thin layer of the solid potting mass having the hollow filaments embedded therein is removed by planing or milling using a knife blade edge moving in an essentially arcuate path at sufficient velocity to cause fracturing of at least one of the hollow filaments and solid potting mass at the point of contact with the knife edge.

10 Claims, No Drawings

METHODS OF CUTTING PATTED HOLLOW FILAMENTS

This invention pertains to methods for producing permeation separation apparatus having a plurality of hollow filaments suitable for effecting separation by permeation which at least one end portion of the hollow filaments is embedded in an end sealing means, said end sealing means comprising a solid potting mass. Particularly, this invention pertains to methods for removing a thin layer of the potting mass whereby the structural integrity of the hollow filaments and potting mass can be retained and the bores of the hollow filaments are exposed to provide fluid communication openings having a desirably degree of openness.

Hollow filament permeation apparatus for fluid separations comprise a plurality of hollow filaments. Each of the filaments has an exterior side and a bore side with the feed being passed to the exterior or bore side of the filaments and a permeated product being collected at the opposite side. In order to ensure the physical separation of the feed and permeate product, often at least one end segment of each of the hollow filaments is embedded in an essentially fluid impermeable sealing means. When installed in a suitable enclosure, the sealing means provides a barrier between the exterior and bore sides of the hollow filaments. The sealing means should thus sufficiently contact the exteriors of the hollow filaments such that fluid cannot pass across the sealing means at the interface with the hollow filaments. The sealing means is advantageously adapted to be mounted in the enclosure in a fluid-tight relationship with the enclosure, and thus the sealing means may be required to be of predetermined dimensions. Especially in separation operations in which significant pressure differentials across the hollow filaments are utilized, the sealing means must exhibit high structural strength.

One suitable method for embedding hollow filaments within the sealing means involves casting or otherwise forming a solid potting mass encompassing all the filaments at least one segment to form the sealing means. The mass is then severed to expose the bores, i.e., provide fluid communication openings, of the hollow filaments. Various methods have been suggested for severing a solid potting mass containing hollow filaments to be used in selective permeation apparatus. For instance, Swartling in U.S. Pat. No. 3,503,288 notes at column 2, lines 33 et seq., that the cutting of sealing means comprised of epoxy is difficult because the micro-sized filament openings become smeared closed when cut with conventional cutting tools with conventional cutting action. Swartling states at column 3, lines 70 et seq., that one of the more effective methods for cutting his epoxy masses involves hand trimming with a scalpel. This method was found to provide separation apparatus having about 50 percent theoretical filament openness. Swartling notes that fracturing an epoxy seal by the application of a controlled bending force or a shaped explosive charge has provided filament openness approaching 100 percent, but that such methods are commercially and technically unacceptable since they are difficult to utilize with larger diameter sealing means due to the forces required, the difficulty in predicting and controlling the fracture, and the damage which may occur to the integrity of the sealing means between, e.g., the epoxy mass and the hollow filaments. Swartling disclosed an apparatus for cutting a epoxy mass having the hollow filaments embedded therein which apparatus employs a specially designed strong rigid cutting element which is circumferentially moved with respect to the epoxy mass under certain conditions of speed, cutting angle and the like. Although the apparatus is complex, Swartling reports improved openness using the apparatus.

In accordance with this invention, methods are provided for removing thin layers from solid potting means containing hollow filaments for fluid separations to expose the bores of the hollow filaments and provide a high proportion of openness of the fluid communication openings. The potting mass may or may not be severed to provide a surface for treatment in accordance with this invention. When severing is desired, any suitable method may be used to sever the potting mass to expose the bores of the hollow filaments embedded in the potting mass without undue concern as to the openness of the hollow filaments, and the severed potting mass can be treated in accordance with this invention to provide a desirably high proportion of openness of the fluid communication openings. Hence, conventional cutting tools such as saws, knives, and the like can be employed to sever the potting mass to expose the hollow filaments and to approximate the desired dimensions of the potting mass for installation in a fluid separation apparatus. The tools employed for severing can thus be chosen on the basis of processing efficiency in making the sealing means or the simplicity of and capital expense required for such tools.

In the methods of this invention, a thin layer of the potting mass is removed by planing or milling using a knife blade edge moving in an essentially arcuate path at sufficient velocity to cause fracturing of at least one of the hollow filaments and solid potting mass at the point of contact with the knife edge. Thus, a primary mechanism for the removal of the thin layer of at least one of the hollow filaments and solid potting mass is by fracturing or chipping small pieces of material. The fracturing is localized at the point of contact with the knife edge. Hence, undue unpredictable fracturing is minimal. Therefore, a relatively predetermined thin layer can be removed. Moreover, since fracturing generally provides a substantially clean cleavage, i.e., the fractured surface is essentially absent of deformities caused by non-elastic flow of the material, a desirably high proportion of openness of the hollow fibers can be obtained.

The knife blade moves in an arcuate path in accordance with this invention. The arcuate path enables the knife blade to approach the material treated, strike the material, and then recede from the material while pulling the material to be removed away. This receding force tends to enhance the fracturing action such that a thin layer of predetermined thickness can be removed without undue, unpredictable fracturing. Furthermore, the arcuate path of the knife blade enables the removal of only small amounts of material at a single pass thereby facilitating the desired fracturing as well as minimizing the effect of deviations from the intended fracture. The radius of the arcuate path of the knife blade may vary widely in view of the small thicknesses of the thin layer which may have to be removed to expose the bores of the hollow fibers such that a high proportion of openness is provided. Frequently, the radius of curvature is up to about 15 centimeter, e.g., at least about 1 centimeter, say, about 1 to 10 centimeters. The edge of the knife blade is advantageously positioned such that it strikes the material approximately when the arcuate path of the knife blade edge begins to recede from the material. Also, the knife blade is advantageously oriented such that, when the blade strikes the material, the bevel of the blade forces the material being removed away from the remaining material, and the blade does not drag on the remaining material.

In order to effect the desired fracturing, the speed of the knife edge with respect to the material must be sufficiently high, e.g., at least about 5 meters per second. Frequently, the speed of the knife blade at time of contact with the material is at least about 10 meters per second. Speeds of 200 meters per second or more may be employed; however, they may be undesirable from standpoints of fatigue of the apparatus, noise generation, and protection requirements in for event of failure. Often, speeds of about 15 to 100 meters per second are used. Most frequently, the desired arcuate path of the knife blade is produced by rotating the knife blade around an axis. For instance, one or more knife blades can be mounted on a cylinder and extend generally outwardly therefrom. The cylinder is adapted to rotate around its axis, and the revolutions per minute of the cylinder determine the speed of the knife blade. Often the speed of rotation is at least about 1000, say, up to 20,000 or more, revolutions per minute. The rotating movement of the knife blade also serves several other advantageous functions. For example, the knife blade is in contact with the material for planing or milling only for a brief period of time during a revolution. Accordingly, the knife blade is able to dissipate heat energy between contacts with the material, and hence the life of the knife blade may be extended, and the presence of undue amounts of heat which may adversely affect the material being planed or milled, especially if the material comprises thermoplastics, is avoided. The rotating blades may also act as a fan to bring cooler air in contact with the surface being treated to abate the build-up of heat energy.

In removing the thin layer, the edge of the knife blade is the first portion of the knife blade to come in contact with the material. Advantageously, the knife blade is situated such that it does not drag across the surface exposed by previous fracturing since undue contact of the knife blade with the exposed surface may tend to deleteriously affect the surface, e.g., by tending to smear or deform the hollow fibers thereby reducing the proportion of openness. Desirably, the arucate path of knife blade is moved across the surface of the material being treated in substantially the same direction as the path of the knife blade as it contacts the surface. Frequently, the knife blade edge substantially impacts the material such that a cutting action can occur. For instance, the edge of the knife blade impacts the material generally parallel to the resulting surface of the material. The edge of the knife blade is preferably relatively sharp, e.g., has a radius of sharpness of less than about 2.5 microns, say, about 0.1 to 2 microns. The edge may have single or plural bevels.

The thin layer which is removed to provide a desirably high proportion of openness of the hollow filaments is frequently less than about 800 microns, and is often less than about 500 microns, e.g., about 20 to 500, say, about 50 to 500, microns. If the surface to be treated in accordance with this invention is rough, or considerable amounts of material need to be removed to provide a sealing means of desired dimensions, then several thin layers may be removed. The first layers removed may be significantly thicker than the final layers which are removed. In some instances, the first layers may have thicknesses of up to about 5000 microns or more. Several relatively thin final layers may be removed to ensure the provision of a relatively smooth surface with a high proportion of openness of the hollow filaments, e.g., an openness of at least about 70, and often at least about 80 or 90, percent.

The width of the knife blade edge may vary over a wide range. It may often be desirable that the width of the knife edge be at least the width of the surface of the potting mass being planed or milled in accordance with this invention. It is evident, however, that the blade edge width may be significantly narrower with several passes with the knife blade being made to ensure treatment of the entire surface of the potting mass. Frequently, the knife blade edge width is at least about 5 centimeters and may be up to about 50 or more centimeters.

Conventional planing and milling devices have been found to be useful in the methods of this invention. In general, these devices comprise a rotatable cylinder having one or more knife blades extending outwardly from the face of the cylinder. The knife blades may extend substantially radially from the cylinder, or at a lesser angle to the cylinder including tangentially extending from the cylinder. Often, the knife blade extends from the cylinder at an angle of about 0° to 45° from the tangent. The blade may be substantially parallel to the axis of the cylinder or it may be convoluted, i.e., tend to wrap around the cylinder as it extends axially along the cylinder.

In accordance with this invention, hollow filaments are embedded in a solid potting mass in any suitable manner, e.g., by casting such as disclosed in U.S. Pat. Nos. 3,339,341 (Maxwell, et al) and 3,442,389 (McLain) or by impregnating with casting material while winding hollow filaments such as disclosed in U.S. Pat. Nos. 3,455,460 (Mahon) and 3,690,465 (McGinnis et al), herein incorporated by reference. The solid potting mass may be comprised of any suitable material which exhibits sufficient structural strength for providing the sealing means and which is relatively inert to materials to which it will be exposed during fluid separation operations. Preferably, the potting is capable of being fractured when impacted by the knife blade edge in accordance with this invention. An often useful guide for selecting suitable materials for the potting mass is the impact strength of the material. For instance, suitable materials frequently exhibit an Izod impact strength (ASTM D256) of at least about 0.05 centimeter-kilogram per centimeter of notch (cm-kg/cm-notch), and often at least about 0.5, say, about 1 to 100 or more, cm-kg/cm-notch.

The material for the solid potting mass may be organic, inorganic or organic containing inorganic material, and the material may be natural or synthetic. Typical inorganic materials include glasses, ceramic, cermets, metals, and the like. Conveniently, the material of solid potting mass comprises a resin such as an epoxy resin. The epoxy resin may comprise any suitable epoxy polymer such as the polyglycidyl ethers and polyglycidyl esters of polyfunctional alcohols or acids, e.g., difunctional glycidyl ethers or esters of difunctional alcohols or acids. The polyfunctional alcohols or acids may be aliphatic or aromatic-containing compounds including hydroxy-containing polyethers. Often the polyfunctional compounds, e.g., polyols, contain at least one aromatic moiety due to the generally greater structural properties provided by the aromatic-containing epoxies as compared to the structural properties exhibited by many non-aromatic-containing epoxies. Illustrative of the aromatic-containing polyols are the polyhydric phenols which may be mononuclear phenols and polynuclear phenols and included within the group of polynuclear phenols are phenol-aldehyde condensation products (novolacs) such as phenol-formaldehyde resins and o-cresol-formaldehyde resins, (2,2-bis(4-hydroxyphenyl)propane), 4,4'-dihydroxybenzophenone, 1,1-bis(4-hydroxyphenyl)ethane, bis(2-hydroxynaphthyl)methane, 2,2-bis(4-hydroxyphenylbutane), bis(4-hydroxyphenyl)sulfone, and the like. Mononuclear polyhydric phenols include resorcinol catechol, hydroquinone, phloroglucinol, and the like. Commonly, the epoxy is cured with a curing agent such as a polyfunctional amine, e.g., an aromatic diamine or mixture of adduct of mixtures thereof. Typical amines unlike m-phenylene diamine, methylene dianiline, mixtures (including adducts) of m-phenylene diamine and methylene dianiline, diamino diphenyl sulfone, 4-chloro-o-phenylenediamine, and the like. Other useful curing agents include the 2,4-dialkylimidazoles such as 2-ethyl-4-methylimidazole. Polyfunctional acids which may find applications in providing polyglycidyl esters include phthalic acid, isophthalic acid, linoleic dimer acid, etc. A more detailed discussion of epoxy resins may be found in, for instance, the *Encyclopedia of Polymer Science and Technology*, Volume 6, pages 209 et seq., Lee, et al, *Epoxy Resins,* McGraw-Hill (1957), and Lee, et al, *Handbook of Epoxy Resins,* McGraw-Hill (1967). Other resins which may find application for use in accordance with this invention include the phenolic resins; polyester resins, for instance of the alkyl or styrene type, melamine-formaldehyde resins; urea-formaldehyde resins; polycarbonates and polyacrylics, e.g., polymethylmethacrylate. The resin may contain fillers, plasticizers, accelerators, bond promoting agents, and other adjuvants.

The hollow filaments which are embedded in the solid potting mass may be of any convenient configuration, e.g., circular, hexagonal, trilobal, or the like in cross-section and may have ridges, grooves, or the like extending inwardly or outwardly from the walls of the filaments. Generally, maximum outside dimension of the cross-section of the filaments is at least about 10 microns and often is up to about 1000 microns, e.g., about 50 to 800, say, about 200 to 800, microns. The minimum wall thickness of the filaments is frequently at least about 1 micron, e.g., between about 10 or 20 and 300, say, about 100 to 200, microns. The ratio of wall thickness to outside diameter of the hollow filaments is frequently about 0.05 to 0.1 to 0.45 to 0.48, e.g., about 0.25 to 0.4.

Advantageously, this invention enables a wide range of materials to be employed for the fabrication of the hollow filaments. Desirably, the material of the hollow filaments should be capable of fracturing when impacted with the knife blade edge in accordance with the method of this invention. An often useful guide for selecting suitable materials for the hollow filaments is the impact strength of the material. For instance, suitable materials frequently exhibit an Izod impact strength (ASTM D 256) of at least about 0.05, e.g., at least about 0.1, say, about 1 to 100 or more, cm-kg/cm-notch. The hollow filaments are useful in fluid separations, i.e., they may serve as a support for a coating which provides the selection separation or as the medium which effects the separation. The material for the hollow filaments may be synthetic or natural and may be inorganic, organic or organic mixed with inorganic. Typical inorganic materials for the hollow filaments may be glasses, ceramics, cermets, metals, and the like. The organic materials are generally polymeric in nature, especially when in the configuration of the hollow filaments. Typical polymers suitable for the hollow fibers can be substituted or unsubstituted polymers and may be selected from polysulfones; poly(styrenes), including styrene-containing copolymers such as acrylonitrile-styrene copolymers, styrene-butadiene copolymers and styrene-vinylbenzylhalide copolymers; polycarbonates; cellulosic polymers, such as cellulose acetate-butyrate, cellulose propionate, ethyl cellulose, methyl cellulose, nitrocellulose, etc.; polyamides and polyimides, including aryl polyamides and aryl polyimides; polyethers; poly(arylene oxides) such as poly(phenylene oxide) and poly(xylylene oxide); poly(esteramide-diisocyanate); polyurethanes; polyesters (including polyarylates), such as poly(ethylene terephthalate), poly(alkyl methacrylates), poly(alkyl acrylates), poly(phenylene terephthalate), etc.; polysulfides; polymers from monomers having the alpha-olefinic unsaturation other than mentioned above such as poly(ethylene), poly(propylene), poly(butene-1), poly(4-methyl pentene-1), polyvinyls, e.g., poly(vinyl chloride), poly(vinyl fluoride), poly(vinylidene chloride), poly(vinylidene fluoride), poly(vinyl alcohol), poly(vinyl esters) such as poly(vinyl acetate) and poly(vinyl propionate), poly(vinyl pyridines), poly(vinyl pyrrolidones), poly(vinyl ethers), poly(vinyl ketones), poly(vinyl aldehydes) such as poly(vinyl formal) and poly(vinyl butyral), poly(vinyl amides), poly(vinyl amines), poly(vinyl urethanes), poly(vinyl ureas), poly(vinyl phosphates), and poly(vinyl sulfates); polyallyls; poly(benzobenzimidazole); polyhydrazides; polyoxadiazoles; polytriazoles; poly(benzimidazole); polycarbodiimides; polyphosphazines; etc., and interpolymers, including block interpolymers containing repeating units from the above such as terpolymers of acrylonitrile-vinyl bromide-sodium salt of para-sulfophenylmethallyl ethers; and grafts and blends containing any of the foregoing. Typical substituents providing substituted polymers include halogens such as fluorine, chlorine and bromine; hydroxy groups, lower alkyl groups; lower alkoxy groups; monocyclic aryl; lower acyl groups and the like. The polymer may contain modifiers, plasticizers, fillers, etc.

The end segments of the hollow filaments can be embedded in the material of the pottering mass in any suitable manner. For instance, the material may be molten or a liquid, uncured resin when the hollow filaments are embedded in the potting mass. For instance, the end segments of the filaments may be individually coated with the material of the potting mass in liquid form and then end segments joined laterally to form an aggregate (or bundle) of the filaments in a desired cross-sectional configuration and the liquid solidified, e.g., by cooling or curing. Alternatively, the end segments of the filaments may be joined laterally and placed in a mold. The liquid form of the material of the potting mass can be introduced around or within the bundle of filaments and into the mold to provide a predetermined configuration to the potting mass with the end segments of filaments therein. In order to assist in distributing the liquid form of the material of the potting mass throughout the cross-section of the bundle of filaments pressure may be applied, e.g., by centrifuging.

After the potting mass has solidified, often the potting mass is severed to expose the ends of the hollow filaments. The severing can be conducted employing any suitable means regardless of the resulting openness of the bores of the hollow filaments provided that undue damage to the contact between the potting mass and the hollow filaments does not occur, which damage adversely affects the desired substantially leak-proof relationship. Conveniently, the potting mass can be severed employing sharp knife edges, e.g., having a radius of sharpness at less than about 2.5 microns, saws, bending fracture, and the like. The severing of the potting mass is generally substantially transverse to the orientation of the hollow filaments to expose ends of the hollow filaments.

Whether or not the potting mass needs to be severed prior to planing or milling in accordance with the methods of this invention, at least one face is provided on the potting mass at which the hollow filaments terminate. The face may be any suitable configuration and is generally substantially circular in cross-section. The at least one face may be substantially flat or may be curved or irregular in surface configuration. The at least one face is planed or milled in accordance with the methods of this invention to remove a thin layer of material and expose the bores of the hollow fibers and provide a high proportion of openness of the bores.

One method for determining the openness of the bores of the hollow filaments is to visually examine the exposed ends of the hollow filaments embedded in the solid potting mass. Even though the ends of the hollow filaments may visually appear to be substantially open, minor obstructions which may partially close an opening may significantly affect the flow of the fluid to or from the bore of the filaments. The effect of these minor obstructions is further amplified in separation systems employing smaller diameter hollow filaments which are frequently employed in liquid separation systems. Accordingly, the openness of the hollow filaments can be determined by fluid flow measurements through the bores of the hollow filaments. For instance, water can be passed through the bores of the hollow filaments and the pressure drop and flow rates can be compared with the theoretical flow through the fibers calculated from Poiseuille's law assuming laminar flow. Desirably, an openness of the hollow filaments of at least about 70, say, at least about 80, most preferably at least about 90 or 95, percent is achieved.

After removing a thin layer of material from the solid potting mass in accordance with a method of this invention, small fragments of the material removed may rest on the face of the potting mass having the hollow filaments terminating thereat. These small fragments can be removed using any suitable method. For instance, if both ends of the bores of the hollow filaments are open, fluid can be passed through the bores to remove small fragments which may tend to obstruct the filaments. Generally, adequate removal of these small fragments can be accomplished by picking them up with an adhesive which can be removed from the potting mass without damage to the potting mass or hollow filaments and which adheres to the small fragments to a greater degree than the small fragments adhere to the potting mass or hollow filaments.

The following example is provided to further illustrate the invention but are not in limitation thereof. All parts and percentages of liquids and solids are by weight and all parts and percentages of gases are by volume, unless otherwise stated.

Approximately 60,000 anisotropic polysulfone hollow filaments prepared by substantially the procedure described in Example 64 by Henis, et al., in U.S. patent application Ser. No. 832,841, filed Sept. 13, 1977, herein incorporated by reference, are potted in an epoxy resin. The hollow filaments have an outside diameter of about 540 microns and an inside diameter of about 250 microns, and the material of the hollow filaments exhibits an impact strength (Izod ASTM D 256) of about 6.5 cm-kg/cm-notch (25° C.). The hollow filaments are potted by substantially parallelly orienting the filaments in a circular configuration of about 8 to 9 centimeters in diameter, sealing the bores at one end of the filaments and then inserting the sealed ends of the hollow filaments into a cylindrical mold which has a diameter of about 10 centimeters and a depth of about 40 centimeters. An uncured bisphenol A-derived diglycidyl ether (a composite of Epon 815 available from the Shell Company and Versamid 140 a polyamide resin having an amine value of about 370 to 400 available from General Mills, Inc.) is gradually added to the mold such that undue exotherms do not occur. The cured epoxy has an impact strength of over about 10 cm-kg/cm-notch. The mold is removed after the epoxy has irreversibly set, and the epoxy is cured for at least about one week.

The resulting potting mass is cut using a hand saw to expose ends of the hollow filaments. An electric hand planer having two straight blades mounted on a rotatable cylinder and a no-load speed designation of 15000 revolutions per minute obtained from Sears, Roebuck & Co. as Craftsman Power Planer #9GT1732 is employed to remove thin layers of material and provide a desirable proportion of openness of the exposed hollow filaments. The blades are sharpened to have a double bevel edge. Several rough cuts are made with the hand planer, e.g., about 0.8 to 3 millimeters in thickness. Visual examination of the hollow filaments reveals that many of the hollow filaments are deformed closed. Several passes of the planer are made over the face of the potting mass with a cutting depth of about 0.4 millimeters. Visual examination of the hollow filaments reveals that substantially all of the bores of the hollow filaments are open. Reinforced adhesive packaging tape is employed to remove small fragments of the material of the potting mass and hollow fibers from the face of the potting mass.

We claim:

1. A method for removing thin layers from solid potting masses containing hollow filaments for fluid separations to expose the bores of the hollow filaments comprising moving a knife blade edge in an essentially arcuate path to impact the potting mass with the knife blade edge at a sufficient velocity to cause localized fracturing of the potting mass at the point of impact thereby removing the thin layer of the potting mass.

2. The method of claim 1 wherein the knife blade edge moves at a sufficient velocity to cause localized fracturing of the hollow filaments.

3. The method of claim 2 wherein the knife blade is rotatably moved and impacts the potting mass approximately when the arcuate path of the knife blade edge begins to recede from the potting mass.

4. The method of claim 2 wherein the thin layer has a thickness less than about 800 microns and the velocity of the knife blade edge is at least about 10 meters per second.

5. The method of claim 4 wherein the material of the potting mass exhibits an impact strength of at least about 0.5 cm-kg/cm-notch (Izod impact strength ASTM D 256) and the material of the hollow filaments exhibits an impact strength of at least about 0.5 cm-kg/cm-notch (Izod impact strength ASTM D 256).

6. The method of claim 5 wherein the material of the potting mass is an epoxy resin.

7. The method of claim 6 wherein the thin layer has a thickness of about 20 to 500 microns and the velocity of the knife blade edge is about 15 to 100 meters per second.

8. The method of claim 7 wherein the hollow filaments comprise polysulfone.

9. The method of claim 5 wherein the radius of curvature of the arcuate path is about 1 to 10 centimeters.

10. The method of claim 9 wherein the edge of the knife blade has radius of sharpness of less than about 2.5 microns.

* * * * *

UNITED STATES PATENT AND TRADEMARK OFFICE
CERTIFICATE OF CORRECTION

PATENT NO. : 4,183,283
DATED : January 15, 1980
INVENTOR(S) : James C. Danos and Robert J. Heider It is certified that error appears in the above-identified patent and that said Letters Patent are hereby corrected as shown below:

In the title, "Patted" should read -- Potted --.

Column 1, line 16, "desirably" should read -- desirable --.

Column 3, line 16, "for" should read -- the --.

Column 4, line 36, "McLain" should read -- Mendelson --.

Column 5, line 18, "of" should read -- or --.

Column 5, line 54, "to 0.1 to 0.45 to" should read -- or 0.1 to 0.45 or --.

Column 6, line 47, "hydroxy" should read -- hydroxyl --.

Column 6, line 52, "pottering" should read -- potting --.

Signed and Sealed this

Twenty-seventh Day of January 1981

[SEAL]

Attest:

RENE D. TEGTMEYER

Attesting Officer

Acting Commissioner of Patents and Trademarks